United States Patent
Fujiwara et al.

(10) Patent No.: US 12,384,379 B2
(45) Date of Patent: Aug. 12, 2025

(54) INFORMATION PROCESSING DEVICE, VEHICLE CONTROL UNIT, AND ROAD INFORMATION DISTRIBUTION METHOD

(71) Applicant: DENSO CORPORATION, Kariya (JP)

(72) Inventors: Naohiro Fujiwara, Kariya (JP); Atsushi Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 18/191,715

(22) Filed: Mar. 28, 2023

(65) Prior Publication Data

US 2023/0227043 A1 Jul. 20, 2023

Related U.S. Application Data

(63) Continuation of application No. PCT/JP2021/032242, filed on Sep. 2, 2021.

(30) Foreign Application Priority Data

Oct. 5, 2020 (JP) ................. 2020-168243

(51) Int. Cl.
| | | |
|---|---|---|
| *B60W 40/06* | (2012.01) | |
| *B60W 30/08* | (2012.01) | |
| *B60W 40/04* | (2006.01) | |
| *B60W 50/14* | (2020.01) | |
| *B60W 60/00* | (2020.01) | |
| *G08G 1/01* | (2006.01) | |

(52) U.S. Cl.
CPC ............ *B60W 40/06* (2013.01); *B60W 30/08* (2013.01); *B60W 40/04* (2013.01); *B60W 50/14* (2013.01); *B60W 60/0053* (2020.02); *G08G 1/0112* (2013.01); *B60W 2555/00* (2020.02); *B60W 2556/50* (2020.02); *G08G 1/0125* (2013.01)

(58) Field of Classification Search
None
See application file for complete search history.

(56) References Cited

U.S. PATENT DOCUMENTS

| | | | | |
|---|---|---|---|---|
| 8,831,869 B2* | 9/2014 | Bai | ................ | G08G 1/096791 701/472 |
| 9,751,527 B2* | 9/2017 | Moeller | ................ | B60W 10/20 |
| 10,446,026 B2* | 10/2019 | Hayakawa | ....... | G08G 1/096716 |
| 10,656,286 B2* | 5/2020 | Eriksson | .............. | G05D 1/0217 |
| 11,087,625 B2* | 8/2021 | Watanabe | ........ | G08G 1/096791 |
| 11,292,465 B2* | 4/2022 | Zhao | .................. | G08G 1/052 |

(Continued)

FOREIGN PATENT DOCUMENTS

| | | | | |
|---|---|---|---|---|
| CN | 111613055 A * | 9/2020 | .......... | G08G 1/0104 |
| JP | 2008-234044 A | 10/2008 | | |

(Continued)

*Primary Examiner* — Kevin R Steckbauer
(74) *Attorney, Agent, or Firm* — Maschoff Brennan

(57) ABSTRACT

In a road information distribution system, a cloud server detects to road location where an abnormality is occurring based on vehicle location information of a plurality of vehicles or vehicle controlling amount of a plurality of vehicles, and transmits an abnormal road location to a vehicle before identifying a cause of the abnormality. The road information distribution system then notifies the abnormal road location to a driver of the vehicle when the vehicle approaches a predetermined distance from the abnormal road location.

6 Claims, 6 Drawing Sheets

(56) References Cited

U.S. PATENT DOCUMENTS

| | | | | |
|---|---|---|---|---|
| 11,745,752 B2* | 9/2023 | Kaino | | B60W 40/08 |
| | | | | 701/70 |
| 11,776,406 B2* | 10/2023 | Nielsen | | G08G 1/0112 |
| | | | | 701/23 |
| 11,842,644 B2* | 12/2023 | Hirose | | G01C 21/3407 |
| 11,893,882 B2* | 2/2024 | Bai | | G08G 1/0145 |
| 2005/0021229 A1* | 1/2005 | Lee | | G01C 21/30 |
| | | | | 701/472 |
| 2010/0057342 A1* | 3/2010 | Muramatsu | | G01C 21/3697 |
| | | | | 701/533 |
| 2010/0250106 A1* | 9/2010 | Bai | | G08G 1/096791 |
| | | | | 701/117 |
| 2011/0037617 A1* | 2/2011 | Jang | | G08G 1/164 |
| | | | | 340/905 |
| 2012/0158276 A1* | 6/2012 | Kim | | G08G 1/096783 |
| | | | | 701/119 |
| 2013/0289859 A1* | 10/2013 | Kim | | G08G 1/0116 |
| | | | | 701/117 |
| 2018/0299884 A1* | 10/2018 | Morita | | G08G 1/202 |
| 2019/0043274 A1* | 2/2019 | Hayakawa | | G06V 20/58 |
| 2019/0135231 A1* | 5/2019 | Sakuma | | B60R 25/305 |
| 2019/0382013 A1* | 12/2019 | Li | | B60W 30/095 |
| 2020/0080853 A1* | 3/2020 | Tam | | G08G 1/22 |
| 2020/0108835 A1* | 4/2020 | Suzuki | | G07C 5/008 |
| 2020/0353925 A1* | 11/2020 | Kim | | B60W 40/08 |
| 2021/0031775 A1* | 2/2021 | Noma | | B60W 40/06 |
| 2021/0217313 A1* | 7/2021 | Hirose | | G01C 21/3446 |
| 2021/0253099 A1* | 8/2021 | Gotoh | | B60W 30/146 |
| 2023/0084667 A1* | 3/2023 | Honya | | G08G 1/096775 |
| | | | | 701/301 |
| 2023/0120172 A1* | 4/2023 | Yoshimatsu | | B60W 30/0953 |
| | | | | 701/301 |
| 2023/0219568 A1* | 7/2023 | Taniguchi | | B60W 50/04 |
| | | | | 701/301 |
| 2023/0227043 A1* | 7/2023 | Fujiwara | | G08G 1/0133 |
| | | | | 701/70 |
| 2023/0347876 A1* | 11/2023 | Quint | | B60W 30/14 |
| 2023/0349704 A1* | 11/2023 | Quint | | G08G 1/096716 |
| 2023/0373512 A1* | 11/2023 | Li | | G01C 21/3694 |
| 2024/0140433 A1* | 5/2024 | Oyagi | | G08G 1/167 |
| 2024/0174173 A1* | 5/2024 | Iida | | B60Q 9/008 |
| 2024/0221505 A1* | 7/2024 | Yoneyama | | G08G 1/13 |
| 2024/0240966 A1* | 7/2024 | Aga | | G01C 21/3881 |

FOREIGN PATENT DOCUMENTS

| | | | | |
|---|---|---|---|---|
| JP | 2015138316 A | * | 7/2015 | ............ G08G 1/0112 |
| JP | 6203096 B2 | | 9/2017 | |
| JP | 2019-075050 A | | 5/2019 | |
| JP | 2020-091644 A | | 6/2020 | |
| JP | 2020-135635 A | | 8/2020 | |
| JP | 2020-144747 A | | 9/2020 | |
| JP | 2020-154374 A | | 9/2020 | |
| WO | 2017/047687 A1 | | 3/2017 | |
| WO | WO-2021186201 A1 | * | 9/2021 | ............ B60W 30/08 |

* cited by examiner

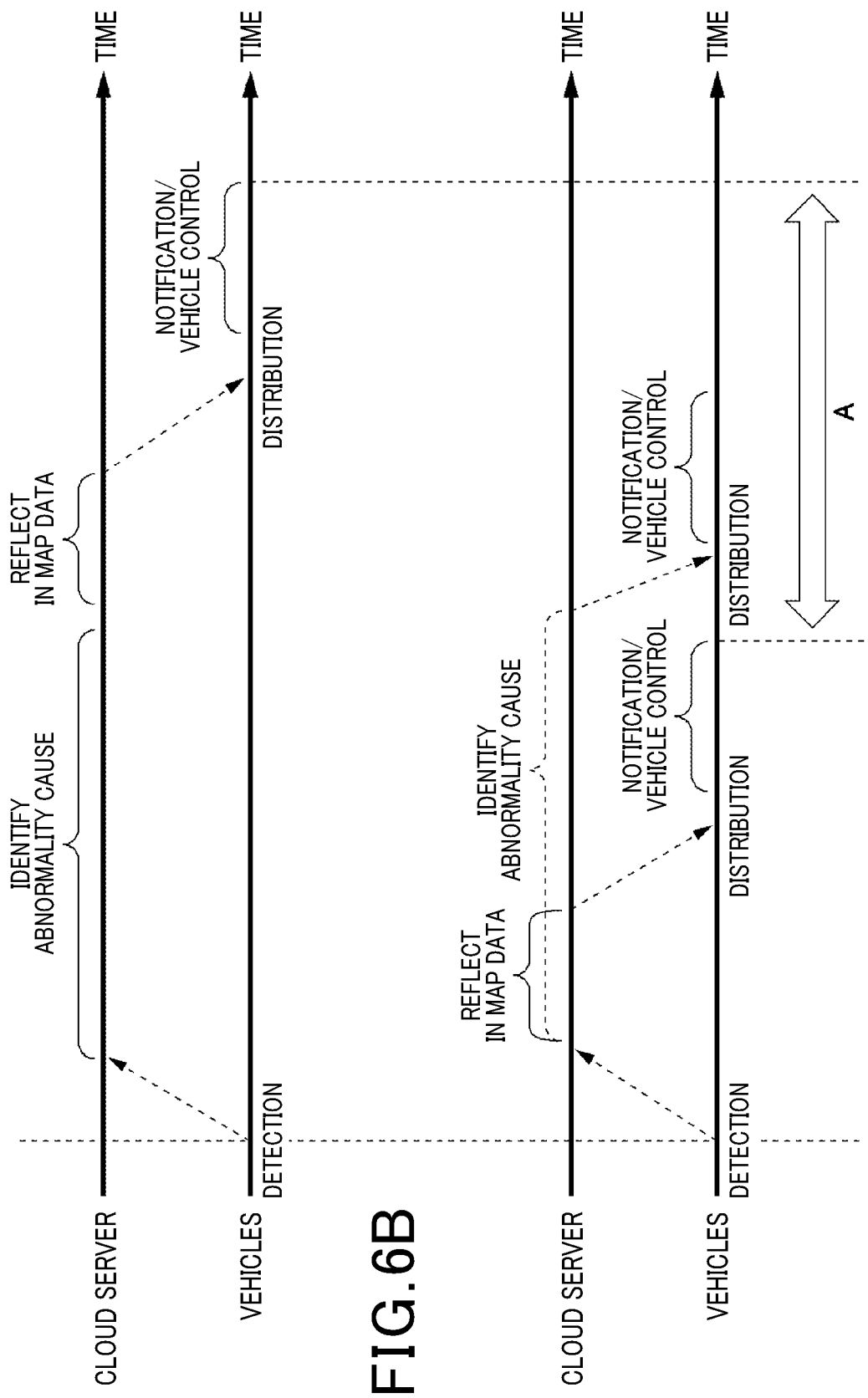

INFORMATION PROCESSING DEVICE, VEHICLE CONTROL UNIT, AND ROAD INFORMATION DISTRIBUTION METHOD

CROSS-REFERENCE TO RELATED APPLICATION

This application is the U.S. bypass application of International Application No. PCT/JP2021/032242 filed on Sep. 2, 2021 which designated the U.S. and claims priority to Japanese Patent Application No. 2020-168243 filed on Oct. 5, 2020, the contents of both of which are incorporated herein by reference.

TECHNICAL FIELD

The present disclosure relates to an information processing device, a vehicle control unit, and a road information distribution method.

BACKGROUND

Traffic information such as traffic accidents and traffic congestion are widely distributed to vehicles, and vehicle drivers drive to their destinations while checking traffic information. Traffic information distributed to vehicles is also used for route guidance to destinations in car navigation systems.

SUMMARY

An information processing device according to an aspect of the present disclosure includes a receiving unit that receives, using a processor, location information indicating traveling location of a vehicle on a road from the vehicle, an abnormality detection unit that detects, using the processor, an abnormal road location, which is a road location where an abnormality is occurring, based on location information of a plurality of the vehicles received by the receiving unit, and a transmitting unit that transmits, using the processor, the abnormal road location detected by the abnormality detection unit to the vehicle before identifying a cause of the abnormality.

A vehicle control unit according to another aspect of the present disclosure includes an information processing device including a receiving unit that receives, using the processor, location information indicating traveling location of a vehicle on a road from the vehicle, an abnormality detection unit that detects, using the processor, an abnormal road location, which is a road location where an abnormality is occurring, based on location information of a plurality of the vehicles received by the receiving unit, and a transmitting unit that transmits, using the processor, the abnormal road location detected by the abnormality detection unit to the vehicle before identifying a cause of the abnormality.

The vehicle control unit further includes a notification unit that notifies, using the processor, the abnormal road location to a driver of the vehicle when the road location from the information processing device is received and the vehicle approaches a predetermined distance from the abnormal road location.

A road information distribution method according to another aspect of the present disclosure includes steps of receiving location information from a vehicle indicating a traveling location of the vehicle on a road, detecting an abnormal road location, which is a location of a road where an abnormality is occurring, based on the received location information of a plurality of vehicles, transmitting the detected abnormal road location to the vehicle before identifying a cause of the abnormality, and notifying the abnormal road location to a driver of the vehicle when the vehicle approaches a predetermined distance from the abnormal road location.

BRIEF DESCRIPTION OF THE DRAWINGS

The above features of the present disclosure will be made clearer by the following detailed description, given referring to the appended drawings. In the accompanying drawings:

FIGS. 6A and 6B show time charts of a distribution timing of abnormal area information of the present embodiment.

DETAILED DESCRIPTION OF THE PREFERRED EMBODIMENTS

Figure 1:
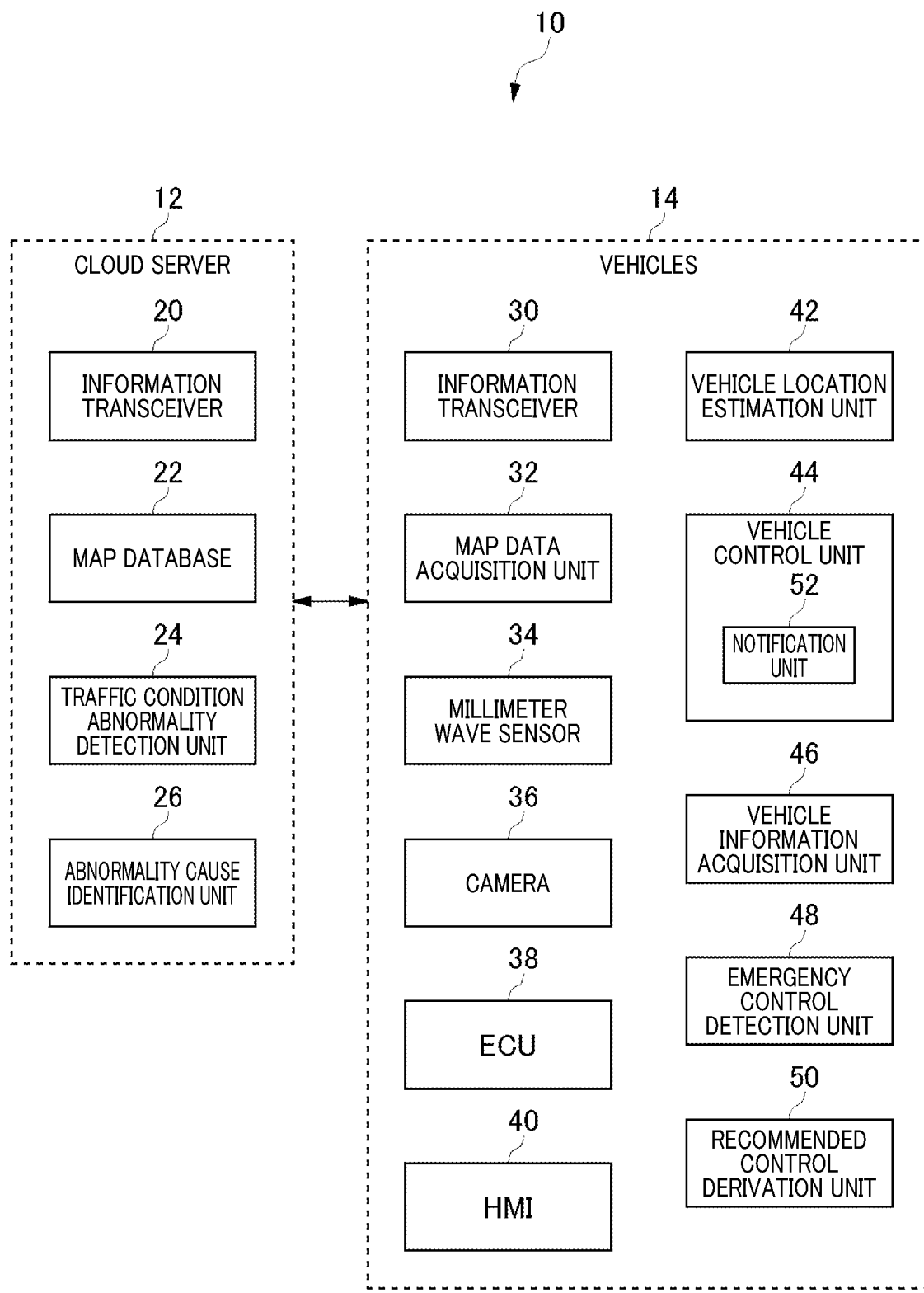
FIG. 1 shows a functional block diagram of a road information distribution system of a present embodiment.

Japanese Patent No. 6203096 discloses a cost-setting device for setting a cost that is used when a navigation device searches for a route, taking into consideration the safety of the route. This cost-setting device detects the links associated with the road closure information to determine the type of cause of the road closure. The cost-setting device sets the cost of other links included in the predetermined area based on the detected link higher when the road closure is due to a predetermined cause, and provides route guidance according to the cost.

Japanese Patent No. 6203096 determines whether a road closure is due to a predetermined cause, so that if there is an abnormality on the road, information about the abnormality is distributed to vehicles after the cause of the abnormality is identified. However, a vehicle traveling in the vicinity of a road where an abnormality is occurring may pass through the road where the abnormality is occurring before information indicating the abnormality is distributed to the vehicle.

In view of the above background, the object of the present disclosure is to provide an information processing device, a vehicle control unit, and a road information distribution method that can distribute the location of roads where an abnormality has occurred to vehicles without delay.

An information processing device according to an aspect of the present disclosure includes a receiving unit that receives, using a processor, location information indicating traveling location of a vehicle on a road from the vehicle, an abnormality detection unit that detects, using the processor, an abnormal road location, which is a road location where an abnormality is occurring, based on location information of a plurality of the vehicles received by the receiving unit, and a transmitting unit that transmits, using the processor, the abnormal road location detected by the abnormality detection unit to the vehicle before identifying a cause of the abnormality.

A vehicle control unit according to another aspect of the present disclosure includes an information processing device including a receiving unit that receives, using the processor, location information indicating traveling location of a vehicle on a road from the vehicle, an abnormality detection unit that detects, using the processor, an abnormal road location, which is a road location where an abnormality is occurring, based on location information of a plurality of the vehicles received by the receiving unit, and a transmitting unit that transmits, using the processor, the abnormal road location detected by the abnormality detection unit to the vehicle before identifying a cause of the abnormality.

The vehicle control unit further includes a notification unit that notifies, using the processor, the abnormal road location to a driver of the vehicle when the road location from the information processing device is received and the vehicle approaches a predetermined distance from the abnormal road location.

A road information distribution method according to another aspect of the present disclosure includes steps of receiving location information from a vehicle indicating a traveling location of the vehicle on a road, detecting an abnormal road location, which is a location of a road where an abnormality is occurring, based on the received location information of a plurality of vehicles, transmitting the detected abnormal road location to the vehicle before identifying a cause of the abnormality, and notifying the abnormal road location to a driver of the vehicle when the vehicle approaches a predetermined distance from the abnormal road location.

According to the present disclosure, the location of the road where the abnormality occurred can be distributed to the vehicle without delay.

With reference to the drawings, hereinafter will be described an embodiment of the present disclosure. Note that the embodiments described below are examples of cases in which the present disclosure is implemented, and are not limited to the specific configurations described below. In implementing the present disclosure, specific configurations may be adopted as appropriate for the embodiment.

FIG. 1 is a functional block diagram of a road information distribution system 10. The road information distribution system 10 is composed of a cloud server 12 and a plurality of vehicles 14.

In the road information distribution system 10 of the present embodiment, the cloud server 12 detects an abnormality occurring on a road based on information transmitted from a plurality of vehicles 14, and the location of the road where the abnormality is occurring (hereinafter referred to as "abnormal road location") is distributed to the plurality of vehicles 14. Then, the vehicle 14 notifies the driver of the vehicle 14 and controls the vehicle 14 based on the distributed abnormal road location. Note that the vehicle 14 to which the abnormal road location is distributed is a vehicle 14 that can send and receive information to and from the cloud server 12, however, it is not limited to a vehicle 14 that cannot send information to the cloud server 12, but can receive information from the cloud server 12.

The cloud server 12 is an information processor and is equipped with an information transceiver 20 consisting of a transmitting unit and a receiving unit, a map database 22, a traffic condition abnormality detection unit 24, and an abnormality cause identification unit 26.

The information transceiver 20 transmits and receives various types of information to and from the vehicle 14. The information transceiver 20 receives, for example, location information of the vehicle 14 (hereinafter referred to as "vehicle location information") and control information of the vehicle 14 (hereinafter referred to as "vehicle control information") from the vehicle 14, and transmits map data and abnormal road locations to the vehicle 14. Vehicle location information indicates the location of the vehicle 14 on the road, and the vehicle control information indicates the amount of control over the vehicle 14.

The map database 22 is a database that stores map data showing the roads on which the vehicle 14 travels.

The traffic condition abnormality detection unit 24 detects an abnormal road location, which is the location of a road where an abnormality is occurring, based on vehicle location information of a plurality of vehicles 14 received by the information transceiver 20. The traffic condition abnormality detection unit 24 detects the location of a road where the amount of vehicle control of a plurality of vehicles 14 exceeds a predetermined threshold as an abnormal road location.

The abnormality cause identification unit 26 identifies the cause of the abnormality (hereinafter referred to as "the abnormality cause") when an abnormal road location is detected by the traffic condition abnormality detection unit 24. The identified the abnormality cause is transmitted to the vehicle 14 via the information transceiver 20.

The vehicle 14 is equipped with an information transceiver 30 consisting of a transmitting unit and a receiving unit, a map data acquisition unit 32, a millimeter wave sensor 34, a camera 36, an ECU (Electronic Control Unit) 38, an HMI (Human Machine Interface) 40, a vehicle location estimation unit 42, a vehicle control unit 44, a vehicle information acquisition unit 46, an emergency control detection unit 48, and a recommended control derivation unit 50.

The information transceiver 30 transmits and receives various types of information to and from the cloud server 12. The information transceiver 30, for example, receives map data, abnormal road locations and causes of abnormalities from the cloud server 12, and transmits the vehicle location and vehicle location information of the own vehicle to the cloud server 12.

The map data acquisition unit 32 acquires and stores map data received from the cloud server 12.

The millimeter wave sensor 34 is an onboard sensor installed in at least one location in front, sides, and rear of the vehicle 14 and measures the distance to an object by emitting short-wavelength radio waves (millimeter waves) and measuring the reflected waves. The camera 36 is an onboard sensor that is installed at least at one location in front, sides, and rear of the vehicle 14 to capture images of the surroundings of the vehicle 14. Note that the onboard sensors are not limited to a millimeter wave sensor 34 and a camera 36, but other sensors, such as infrared sensors, may be mounted on the vehicle.

The ECU 38 is a gas pedal ECU, brake ECU, and steering ECU, etc., which performs acceleration control, deceleration control, and steering control of the vehicle 14, and outputs controlling amounts for acceleration, deceleration, and steering.

The HMI 40 is, for example, a touch panel display that also functions as a car navigation device, is equipped with a speaker, and outputs various information to the driver or others in the vehicle 14 or accepts operations from the driver or others.

The vehicle location estimation unit 42 estimates the location of the vehicle 14 and generates vehicle location information based on location information measured by the GNSS (Global Navigation Satellite System), map data acquired by the map data acquisition unit 32, information indicating the environment surrounding the vehicle 14 acquired by onboard sensors, and the speed of the vehicle 14.

The vehicle control unit 44 performs various processes based on information output from the onboard sensors, the ECU 38, etc., and outputs the processing results to the ECU 38, etc., thereby controlling the vehicle. In addition, the vehicle control unit 44 is also equipped with a notification unit 52.

The notification unit 52 notifies the abnormal road location and the abnormality cause to the driver of the vehicle 14 when the information transceiver 30 receives the abnormal road location from the cloud server 12 and the vehicle 14 approaches a predetermined distance to the abnormal road location. It should be noted that the notification to the driver is performed via the screen and the speaker of the HMI 40 in the vehicle 14.

The vehicle information acquisition unit 46 acquires information regarding the control of the vehicle 14 (vehicle controlling amounts), such as deceleration, acceleration, and steering angle of the vehicle 14, from the ECU 38.

The emergency control detection unit 48 detects the emergency control of the vehicle 14 based on the vehicle controlling amount. The emergency control is, for example, emergency braking, emergency acceleration, emergency steering, etc. Note that the detected emergency control is associated with vehicle location information and transmitted to the cloud server 12 via the information transceiver 30.

When the recommended control derivation unit 50 receives the abnormal road location or the abnormality cause from the cloud server 12, it derives the recommended control for the vehicle 14 based on at least one of the abnormal road location and the abnormality cause. It should be noted that the control contents of the vehicle 14 derived by the recommended control derivation unit 50 are notified to the driver by the notification unit 52.

According to the road information distribution system 10 of the present embodiment, the cloud server 12 detects the road location where an abnormality is occurring based on vehicle location information of a plurality of vehicles 14 or the vehicle controlling amount of a plurality of vehicles 14, and transmits the abnormal road location to the vehicles 14 before identifying the abnormality cause. Thus, the road information distribution system 10 of the present embodiment can distribute the location of the road where the abnormality occurred to the vehicle 14 without delay.

Figure 2:
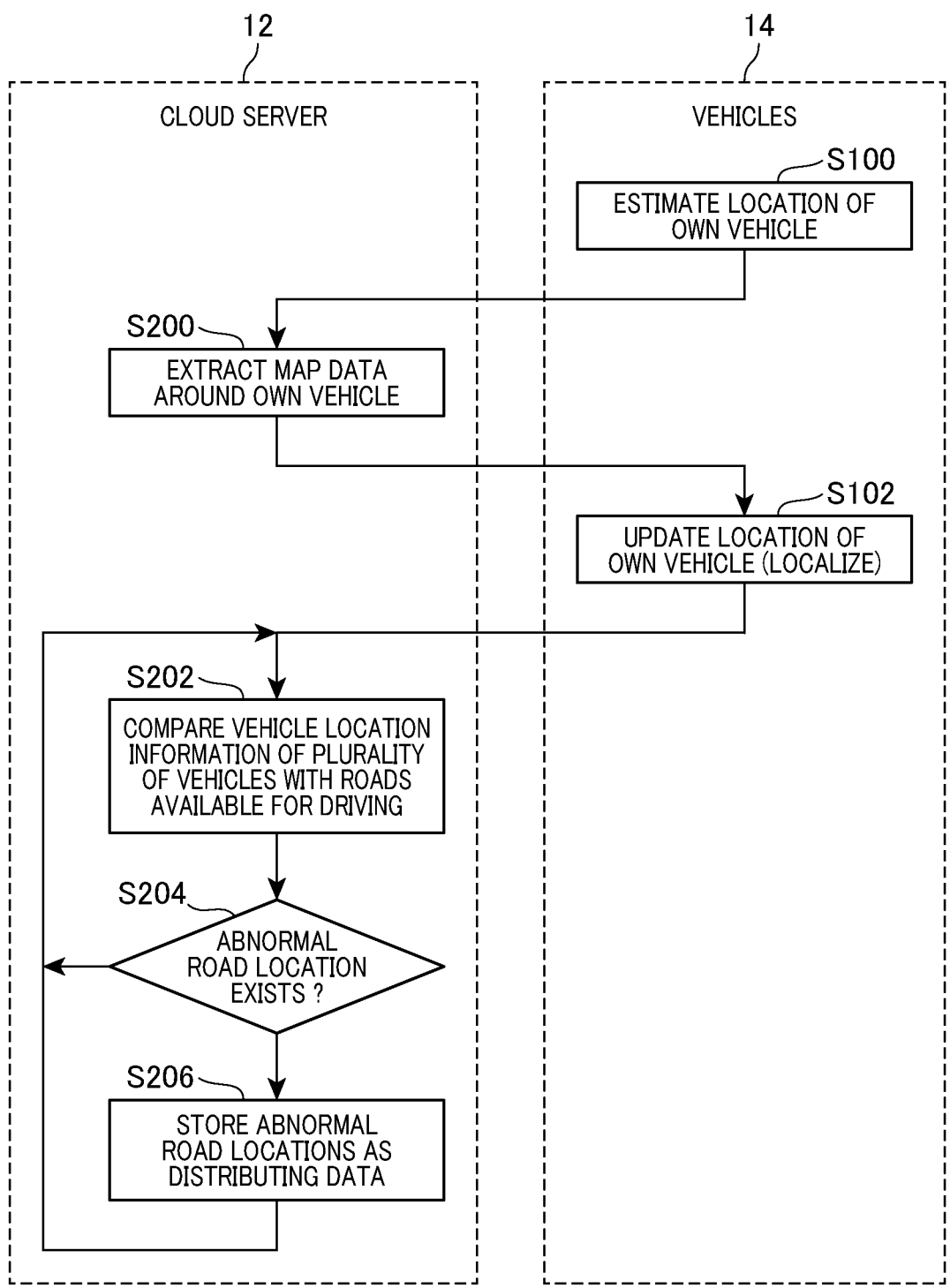
FIG. 2 shows a flowchart of an abnormal road location detection process of the present embodiment.
Figure 3:
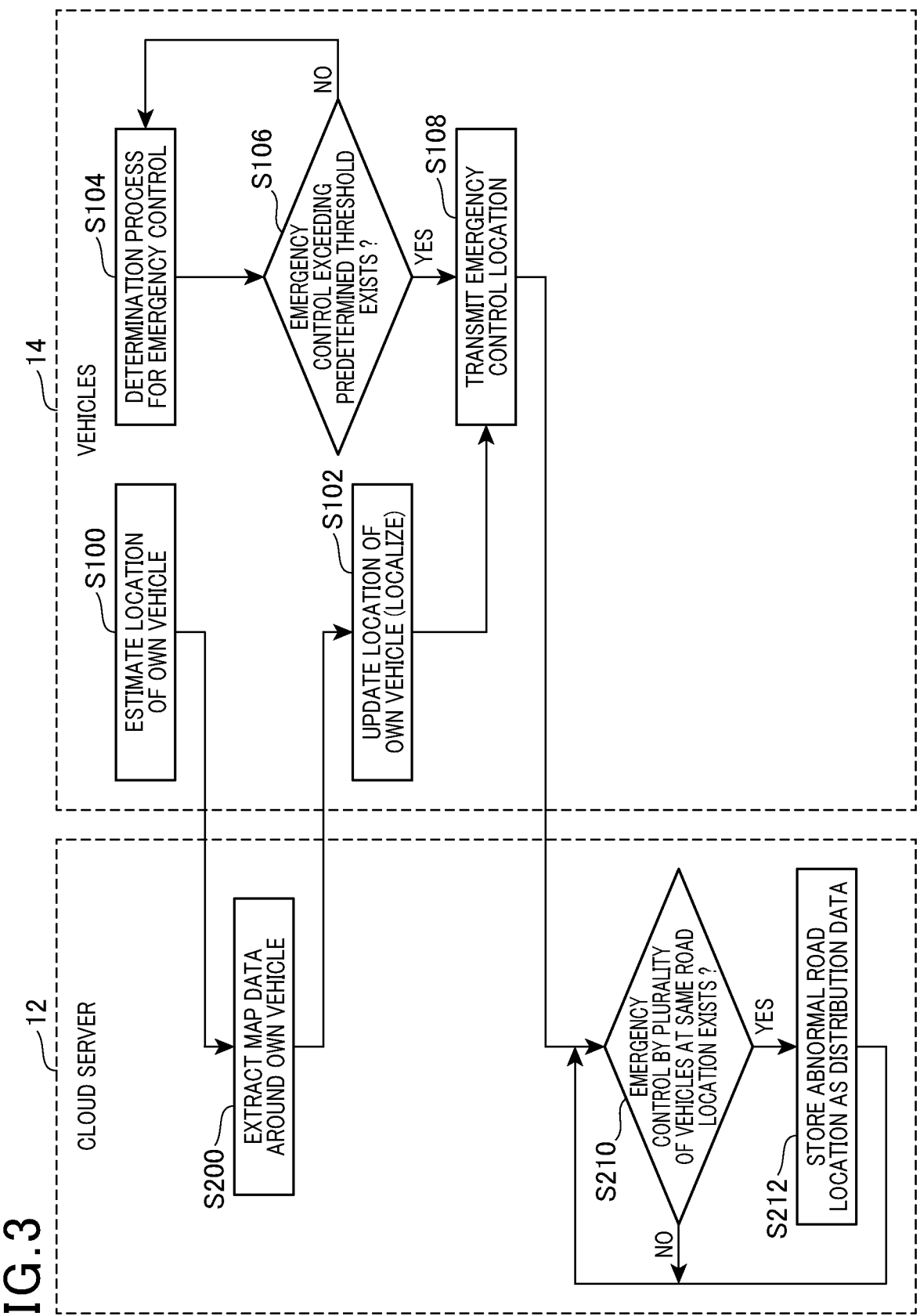
FIG. 3 shows another flowchart of the abnormal road location detection process of the present embodiment.

FIGS. 2 and 3 show the flowcharts of the abnormal road location detection process. The abnormal road location detection process is explained below with reference to FIGS. 2 and 3. It should be noted that the road information distribution system 10 executes the processes shown in FIG. 2 and FIG. 3, but is not limited to this, and one of the processes in FIG. 2 and FIG. 3 may be performed.

FIG. 2 is a driving trajectory upload process that detects abnormal road locations based on vehicle location information of the vehicle 14.

First, in step S100, the location of the own vehicle is estimated based on the vehicle location estimated previously by the vehicle location estimation unit 42 of the vehicle 14 (hereinafter referred to as "own vehicle location estimate"), the measurement results from an acceleration sensor, and the measurement results from the GNSS. The own vehicle location estimate is transmitted to the cloud server 12 by the information transceiver 30.

In the next step S200, the cloud server 12 extracts map data around the own vehicle based on the own vehicle location estimate received from the vehicle 14. The extracted map data is transmitted by the information transceiver 20 to the vehicle 14 that transmitted the own vehicle location estimate.

In the next step S102, the vehicle location estimator 42 updates (localizes) the location of the own vehicle based on the own vehicle location estimate, map data, and recognition results of the own vehicle's surrounding environment acquired by the millimeter wave sensor 34 and the camera 36. This updated location of the own vehicle is transmitted to the cloud server 12 by the information transceiver 30 as vehicle location information.

Note that the processes of step S100, step S200, and step S102 are repeated for each vehicle 14, and vehicle location information is transmitted to the cloud server 12 each time step S102 is completed.

When the information transceiver 20 of the cloud server 12 receives vehicle location information from the vehicle 14, in step S202, the traffic condition abnormality detection unit 24 of the cloud server 12 compares vehicle location information transmitted from the plurality of vehicles 14 with roads available for driving to determine if there are any abnormal road locations.

The roads available for driving are, for example, roads that are always traveled by a plurality of vehicles 14, such as a highway or an arterial road where there is a certain amount of traffic within a predetermined time period. Vehicle location information is continuously transmitted from the vehicle 14 to the cloud server 12 at predetermined time intervals, thereby indicating the travel paths of the vehicle 14. In other words, the traffic condition abnormality detection unit 24 detects road locations where the driving conditions are different from normal by comparing the travel paths of the vehicle 14 with the roads available for driving.

As an example, the traffic condition abnormality detection unit 24 detects the location of a road as an abnormal road location where the number of vehicles 14 traveling within a predetermined time period is less than a predetermined number (hereinafter referred to as the "standard number of vehicles") based on vehicle location information transmitted from a plurality of vehicles 14. Therefore, on a road where a plurality of vehicles should always be traveling, a location where the number of vehicles traveling in a predetermined time period is lower than usual, in other words, a road with fewer travel paths, is determined to have an abnormality. This allows the traffic condition abnormality detection unit 24 to easily detect abnormal road locations.

The standard number of vehicles is stored in the map database 22 in advance associated with the map data, and the standard number of vehicles may be zero, for example. In other words, on a road such as a highway where vehicles 14 are assumed to be always traveling under normal circumstances, a road location where none of the vehicles 14 are traveling within a predetermined time is detected as an abnormal road location. In addition, the standard number of vehicles may be increased or decreased depending on the time of day, even on the same road. For example, the standard number of vehicles driven at night may be set to 50% of the standard number of vehicles driven during the day.

In the next step S204, the traffic condition abnormality detection unit 24 determines whether an abnormal road location has been detected, and if the determination is positive, the process proceeds to step S206. Further, in a case of a negative determination, the process returns to step S202 and repeats abnormality detection of traffic conditions based on vehicle location information transmitted from the plurality of vehicles 14.

In step S206, the cloud server 12 stores the abnormal road locations in the map database 22 as data to be distributed to the vehicle 14.

FIG. 3 is an emergency control information upload process that detects abnormal road locations based on the vehicle location and vehicle control information of the vehicles 14. Note that even in the emergency control information upload process shown in FIG. 3, steps S100, S200, and S102 shown in FIG. 2 are repeated for each vehicle 14.

In step S104, the emergency control detection unit 48 performs the determination process for emergency control in the own vehicle. The presence or absence of emergency control is determined by whether the vehicle controlling amount exceeds a predetermined threshold value. The vehicle controlling amount is at least one of deceleration of the vehicle 14, acceleration of the vehicle 14, and steering amount of the vehicle 14, as described above, for example.

A case in which deceleration of the vehicle 14 exceeds the predetermined threshold is when a sudden braking (emergency braking) is performed on the vehicle 14, and in such a case, an abnormality such as an accident, falling objects, and traffic congestion is considered to have occurred at the road location where the emergency braking of the vehicle 14 took place. In addition, a case in which acceleration of the vehicle 14 exceeds the predetermined threshold value is when sudden acceleration (emergency acceleration) is performed on the vehicle 14, and in such a case, it is considered that there is an abnormality at the road location where emergency acceleration of vehicle 14 was performed, or the vehicle 14 passed an abnormal road location and increased its speed. Further, a case in which the amount of steering of the vehicle 14 exceeds the predetermined threshold is a case in which the vehicle 14 is steered suddenly (emergency steering), and in such a case, an accident and a falling object are considered to have occurred at the road location where the vehicle 14 was steered suddenly.

In the next step S106, the emergency control detection unit 48 determines whether there is emergency control that exceeds a predetermined threshold, and if the determination is positive, the process proceeds to step S108, and if the determination is negative, the process returns to step S104 and repeats the determination process.

In the next step S108, the information transceiver 30 transmits the road location where the emergency control was performed to the cloud server 12 as emergency control location information.

When the information transceiver 20 of the cloud server 12 receives the emergency control location information from the vehicles 14, in step S210, the traffic condition abnormality detection unit 24 determines whether there is an emergency control by a plurality of vehicles 14 at the same road location based on the emergency control location information received from the plurality of vehicles 14, and if the determination is positive, the process proceeds to step S212, and if the determination is negative, repeats step S210.

A case of the emergency control by a plurality of vehicles 14 means that more than a predetermined percentage (e.g., more than 80%) of the vehicles 14 at the same road location have performed the emergency control. Note that the same road location is a concept that includes some distance (e.g., 10 m), not exactly the same road location. In addition, by also determining the presence or absence of the abnormal road location based on the emergency control location information of not one but a plurality of vehicles 14, the occurrence of instantaneous abnormalities, e.g., people or animals entering the road, can be ruled out.

In step S212, the road location where the emergency control occurred is designated as an abnormal road location and is stored by the cloud server 12 in the map database 22 as data to be distributed.

Figure 4:
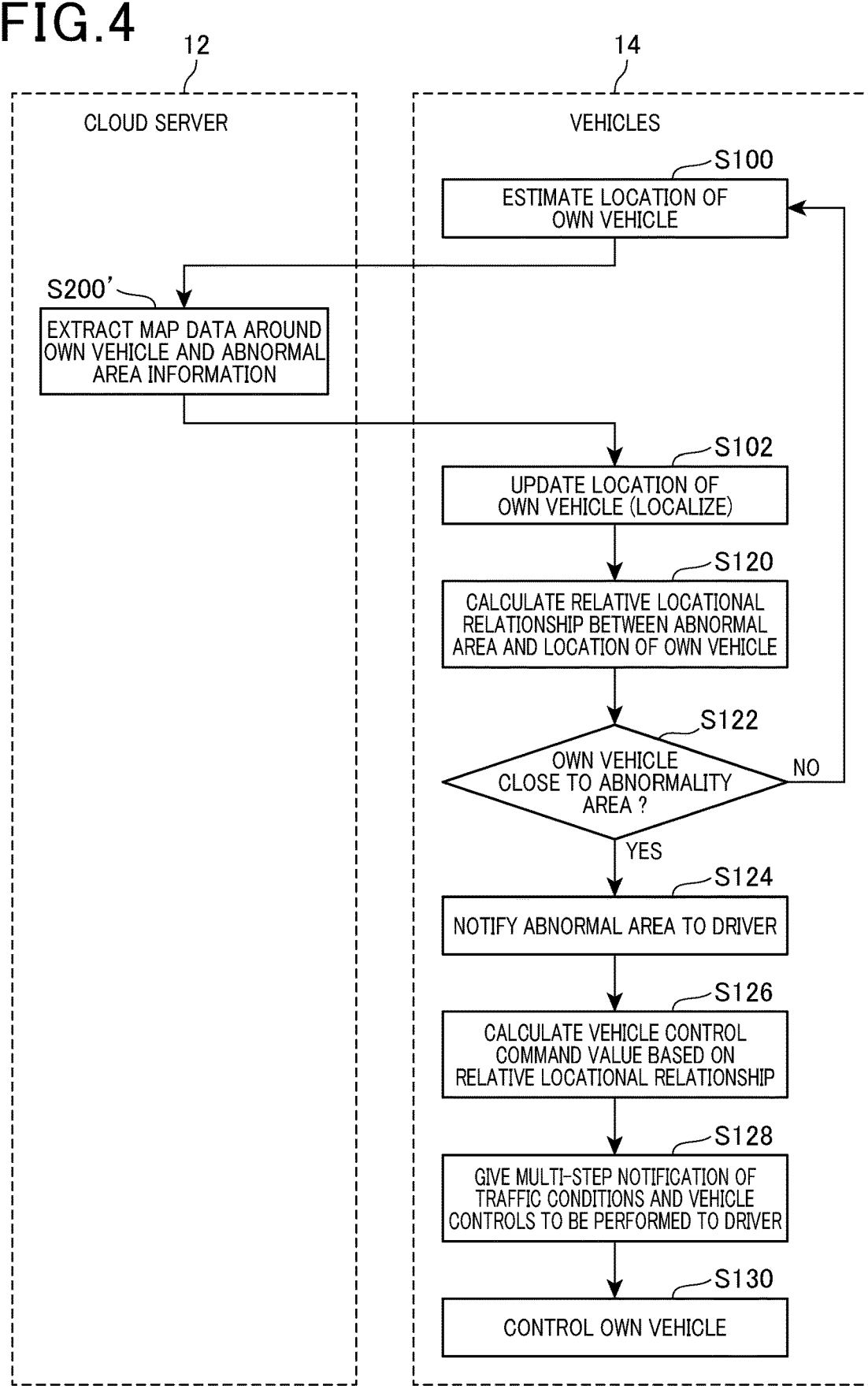
FIG. 4 shows a flowchart of a vehicle control process of the present embodiment.

FIG. 4 shows a flowchart of the vehicle control process based on the abnormal road location. Note that even in the vehicle control process shown in FIG. 4, steps S100 and S102 shown in FIG. 2 are repeated for each vehicle 14. In in addition, in step S200', which is similar to step S200 shown in FIG. 2, abnormal area information is extracted along with the map data around the own vehicle and transmitted to the vehicle 14. Abnormal area information is information indicating one or more abnormal road locations (hereinafter referred to as "abnormal area").

In addition, the abnormal road locations for which the abnormality cause is identified in the abnormal area information are associated with the abnormality cause and transmitted to the vehicle 14. In other words, the abnormal road locations for which the abnormality cause has not been identified are transmitted to vehicle 14 as abnormal area information without the abnormality cause being associated.

In step S120, which follows step S102, the notification unit 52 of vehicle 14 calculates the relative locational relationship between the abnormal area indicated in the abnormal area information and the location of the own vehicle.

In the next step S122, the notification unit 52 determines whether the own vehicle is close to the abnormality area, and if the determination is positive, the process proceeds to step S124, and if the determination is negative, the process returns to step S100. Note that, as an example, the own vehicle is determined to be close to an abnormal area when the own vehicle is within a predetermined distance (e.g., within 100 meters) of the abnormal area that exists in the direction the own vehicle is traveling.

In step S124, the notification unit 52 notifies the driver of the own vehicle of the abnormal area as a point of caution for driving. This notification is performed via the screen and speakers of the car navigation system. Note that if the abnormality cause is associated with the abnormality area, the abnormality cause is also notified to the driver.

In the next step S126, the recommended control derivation unit 50 calculates the recommended control of the own vehicle (vehicle control command value) based on the relative locational relationship between the own vehicle location and the abnormal area. The vehicle control command value at this time is, for example, deceleration control. Note that if the abnormality cause is associated with the abnormality area, the vehicle control command value may be calculated by taking the cause into account. Specifically, if the cause is that an accident has occurred in one of the two lanes, a control command value indicating a lane change is calculated together with deceleration control to avoid the lane where the accident has occurred.

Note that even after the notification according to step S124 and the calculation according to step S126 are performed, step S100 through step 122 are repeated as appropriate because the vehicle 14 is still traveling. Therefore, after notification of an abnormal area for which the abnormality cause has not been identified, the cloud server 12 may identify the abnormality cause for that abnormal area, and the cloud server 12 may transmit the abnormality cause. In such a case, the vehicle control command values are calculated again in step S126, considering the abnormality cause in the abnormality area concerned.

In the next step S128, multi-step notification of traffic conditions and vehicle controls to be performed is given to the driver. Hereafter, the multi-step notification is explained.

The multi-step notification means that when the own vehicle approaches an abnormal area where the abnormality cause has not been identified as described above, the driver is notified only that the vehicle is approaching the abnormal area as the first step. Then, when the abnormality cause in the abnormal area is received by the own vehicle, the next step is to notify the driver of the abnormality cause along with the abnormal area. In addition, the system notifies the driver of recommended vehicle control based on the abnormality area and the abnormality cause. It should be noted that the vehicle control notification may be performed when the own vehicle approaches the abnormality area even if the own vehicle has not received the abnormality cause.

Thus, if the notification unit 52 receives the abnormality cause from the cloud server 12 after notifying the driver of the abnormal road location, the notification unit 52 notifies the cause to the driver of the own vehicle and notifies the control derived from the cause to the driver of the own vehicle. This results in step-by-step notification to the driver of the vehicle 14 of the occurrence of an abnormality, the abnormality cause, and suggestions for control of the vehicle, allowing the driver to recognize the real-time traffic conditions of the road on which the own vehicle is traveling and the recommended driving according to the traffic conditions.

In the next step S130, control of the own vehicle is performed. Note that the control of the own vehicle may be performed by the driver himself based on the contents of the notification, or, if control by the driver himself is too slow, etc., the vehicle control unit 44 may perform the control automatically based on the vehicle control command values. In the automatic case, the vehicle control unit 44 controls the vehicle by using the vehicle control command value, which is the controlling amount of the vehicle derived based on at least one of the abnormal road location and the abnormality cause.

Figure 5:
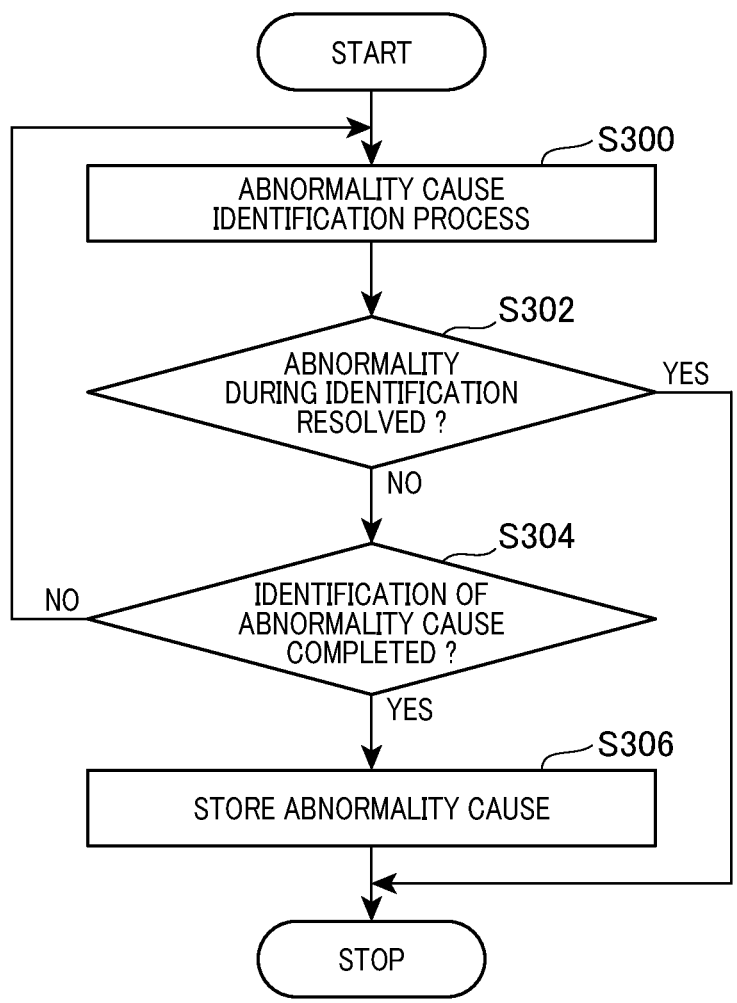
FIG. 5 shows a flowchart of an identification of the cause of an abnormality of the present embodiment.

FIG. 5 is a flowchart showing the flow of identifying the abnormality cause. Identification of the abnormality cause is performed by the abnormality cause identification unit 26 provided by the cloud server 12 as well as the detection of the abnormal road location.

First, in step S300, the abnormality cause identification process is performed. The abnormality cause is identified based on information from infrastructure facilities and recognition results of the surrounding environment transmitted by the vehicles 14 that have passed the abnormal road location.

In the next step S302, whether the abnormality for which the cause is being identified has been resolved is determined, and if the determination is positive, this process is terminated; if the determination is negative, the process proceeds to step S304.

In step S304, it is determined whether the identification of the abnormality cause is complete, and if the determination is positive, the process proceeds to step S306 to store the identified abnormality cause in the map database 22 in association with the abnormality area. If the determination is negative, the process returns to step S300 and continues the process of identifying the abnormality cause.

The determination of whether the abnormality has been resolved is made, for example, by the traffic condition abnormality detection unit 24 determining whether the number of vehicles 14 traveling on the abnormal road location within a predetermined time exceeds the standard number of vehicles. Note that not only this, but the abnormality may be determined to have been resolved when there are no longer vehicles 14 performing emergency control at the location that is considered to be the abnormal road location.

Thus, if the abnormality is resolved before identifying the abnormality cause, the abnormality cause identification unit 26 terminates the identification of the abnormality cause. This prevents the identification of unnecessary anomalies, such as anomalies that can be quickly resolved.

FIGS. 6A and 6B are time charts showing the distribution timing of abnormal area information, and FIG. 6A shows the conventional distribution timing, while FIG. 6B shows the distribution timing of the present embodiment. As shown in FIG. 6A, conventionally, after detecting the abnormal road location and identifying the abnormality cause, the abnormal road location is reflected in the map data and transmitted to the vehicle 14. On the other hand, as shown in FIG. 6B, in the present embodiment, when an abnormal road location is detected, the abnormal road location is reflected in the map data and distributed to the vehicle 14. Then, if the abnormality cause is identified by identifying the abnormality cause along with the detection of the abnormal road location, the abnormality cause is distributed to the vehicles 14.

Thus, in the present embodiment, the abnormal road locations are reflected in the map data and distributed to the vehicles 14 before identifying the abnormality cause. Therefore, as indicated by period A, more abnormal road locations can be distributed to vehicle 14 without delay than in the conventional way. Thus, the driver of vehicle 14 can recognize the abnormal road location before the own vehicle passes by.

Although the disclosure has been described using the above embodiment, the technical scope of the disclosure is not limited to the scope described in the above embodiment. Various changes or improvements can be made to the above embodiment without departing from the gist of the disclosure, and embodiments with such changes or improvements are included in the technical scope of the present disclosure.

In the above embodiment, a range of the road where the abnormality occurred may be detected based on vehicle control information. For example, the location where the abnormality occurs is determined to be the location where the vehicle 14 suddenly decelerates, and then the location where the vehicle 14 suddenly accelerates is determined to be the location where the abnormality is resolved. In other words, the range of the road where the abnormality occurred is determined by making one set of the location of the sudden deceleration and the location of the sudden acceleration.

The vehicle 14 may also be in the form of an automated driving function. In this form, the vehicle control unit 44 may determine whether automatic operation can be continued based on the abnormal road location and the abnormality cause. If the vehicle control unit 44 determines that automatic operation cannot be continued, the system switches from automatic operation to manual operation, in which the driver drives the vehicle himself.

Further, the process flow described in the above embodiment is also an example, and unnecessary steps may be deleted, new steps may be added, or the order of processing may be replaced to the extent that it does not deviate from the main purpose of the present disclosure.

What is claimed is:

1. An information processing device comprising:
   a communication device that communicates with vehicles; and
   one or more processors, wherein:

the communication device receives, from one of the vehicles, location information indicating a traveling location of a particular vehicle on a road, the one or more processors detect an abnormal road location, which is a road location where an abnormality is occurring, based on location information of a plurality of the vehicles received by the communication device, the one or more processors identify a cause of the abnormality when the abnormal road location is detected based on information from infrastructure facilities or recognition results of the surrounding environment transmitted by the vehicles that have passed the abnormal road location, the one or more processors transmit, using the communication device, the abnormal road location to the particular vehicle before identifying the cause of the abnormality, and the one or more processors transmit, using the communication device, the cause of the abnormality to the particular vehicle when the cause of the abnormality is identified after transmitting the abnormal road location to the particular vehicle.

2. The information processing device according to claim 1, wherein
the one or more processors detect a location of the road as the abnormal road location where less than a predetermined number of vehicles have traveled within a predetermined time based on the location information transmitted from the plurality of vehicles.

3. The information processing device according to claim 1, wherein
the one or more processors detect a location of the road as the abnormal road location where a controlling amount of the plurality of vehicles exceeds a predetermined threshold value.

4. The information processing device according to claim 3, wherein
the controlling amount is at least one of deceleration of the particular vehicle, acceleration of the particular vehicle, and steering amount of the particular vehicle.

5. The information processing device of claim 1, wherein
the one or more processors terminate the identification of the cause of the abnormality if the abnormality is resolved before the cause of the abnormality is identified.

6. A road information distribution method using a communication device, one or more processors, and a vehicle control unit comprising:

receiving, by the communication device, location information from a vehicle indicating a traveling location of the vehicle on a road;

detecting an abnormal road location, which is a location of a road where an abnormality is occurring, based on the received location information of a plurality of vehicles;

identifying a cause of the abnormality when the abnormal road location is detected based on information from infrastructure facilities or recognition results of the surrounding environment received from the plurality of vehicles that have passed the abnormal road location;

transmitting the detected abnormal road location to the vehicle before identifying a cause of the abnormality; and notifying the abnormal road location to a driver of the vehicle when the vehicle approaches a predetermined distance from the abnormal road location.

\* \* \* \* \*